Figure 1:
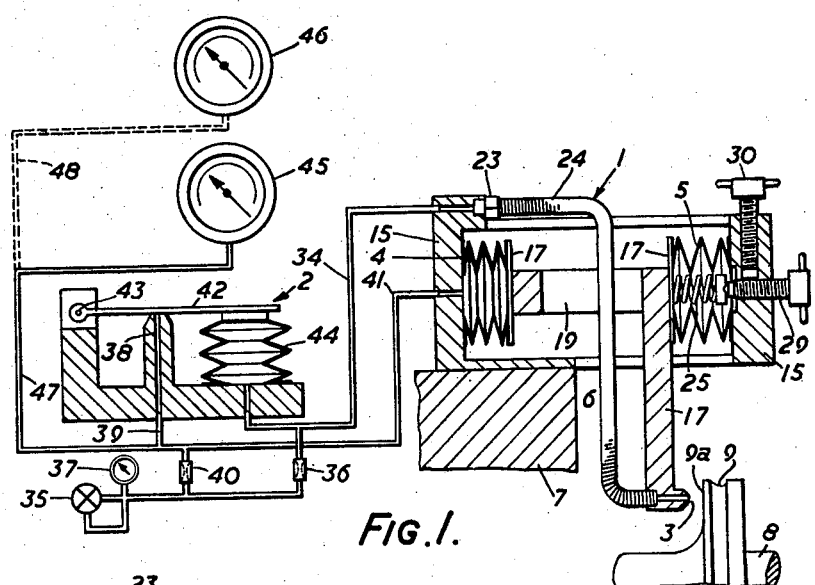

June 25, 1963  H. A. HALLETT  3,094,863
POSITION INDICATORS

Filed May 16, 1960  2 Sheets-Sheet 1

INVENTOR
HENRY A. HALLETT
BY *Irwin S. Thompson*
ATTORNEY

United States Patent Office 3,094,863
Patented June 25, 1963

3,094,863
POSITION INDICATORS
Henry Albert Hallett, Cheltenham, England, assignor to Cheltenham Auto Controls Limited, Cheltenham, England
Filed May 16, 1960, Ser. No. 29,427
Claims priority, application Great Britain May 20, 1959
3 Claims. (Cl. 73—37.5)

This invention relates to position indicators which in use provide an indication of the position of one part relatively to another. The invention is especially suitable for application to position indicators for providing an indication of axial displacement of a rotating body, for example a turbine shaft, relatively to a fixed housing thereof.

During warming up of a gas or steam turbine considerable expansion arises, with the risk of attendant axial movement of the turbine shaft allowing the rotary turbine blading to foul the stationary blading. A similar risk of fouling arises during too rapid acceleration of the turbine or excessive axial movement of the turbine shaft for any other reason. It is thus desirable to have means providing an indication of axial movement of the shaft relatively to the turbine casing in which the shaft is housed, and hitherto this has been obtained by means of a mechanical linkage with an input member bearing on a collar fixed to the shaft and an output member directly indicating shaft displacement on a suitable calibrated scale. Such an arrangement is inherently of limited accuracy which is decreased by a tendency for the input member to maintain only intermittent contact with the rotating collar at high peripheral speeds of the latter. As a result, the minimum axial displacement of the shaft which can be determined with any degree of accuracy is in many cases of the same order as the displacement which will result in fouling of the turbine blading, so that the indication is of little use.

The main object of the invention is to provide a position indicator which can readily be designed to provide an accurate indication of axial displacement of a turbine shaft relatively to the turbine casing.

A further object of the invention is to provide a position indicator giving an indication of the position of one part relatively to another, comprising a nozzle adapted for positioning adjacent a surface the position of which depends upon the relative position of the parts so as to discharge towards that surface, a restrictor through which the nozzle can be supplied from a source of gaseous operating fluid at a predetermined pressure, a mounting for the nozzle adapted to be fixed relatively to the other part and so arranged that movement of the nozzle occurs in dependence upon the pressure downstream of the restrictor whereby to tend to maintain a substantially constant gap between the nozzle outlet and said surface, and means responsive directly or indirectly to said pressure which provide an indication of the relative position of the parts. Said surface will normally be a suitable surface of the other part itself.

The indication may be a direct visual or aural indication or it may be a signal, for example a pneumatic signal, the magnitude of which is a function, and hence indicative, of said relative position. This signal may be employed to provide a remote direct indication of the relative position.

Preferably the nozzle mounting incorporates a metallic bellows system on which the nozzle is carried, in use a control pressure applied to the bellows system being derived in dependence upon the pressure downstream of the restrictor, hereinafter termed the "nozzle pressure." The arrangement is preferably such that the control pressure increases as the nozzle pressure decreases and acts to move the nozzle towards said surface. The control pressure is conveniently utilised to provide the indication of the relative position of the parts and may, for example, be applied to a suitably calibrated pressure gauge the reading of which is a direct visual indication of said relative position.

The control pressure is obtained, according to the invention, by means of a secondary nozzle arranged to be supplied through a secondary restrictor from a source of gaseous operating fluid at a predetermined pressure, the control pressure being obtained from the downstream side of this restrictor and the secondary nozzle being throttled in accordance with the nozzle pressure. Such throttling may be obtained from a flapper moved by a bellows system to which the nozzle pressure is supplied.

Both restrictors are conveniently supplied from a common source of operating fluid, conveniently from a pressure regulator connected to a pressure air line.

Figure 2:
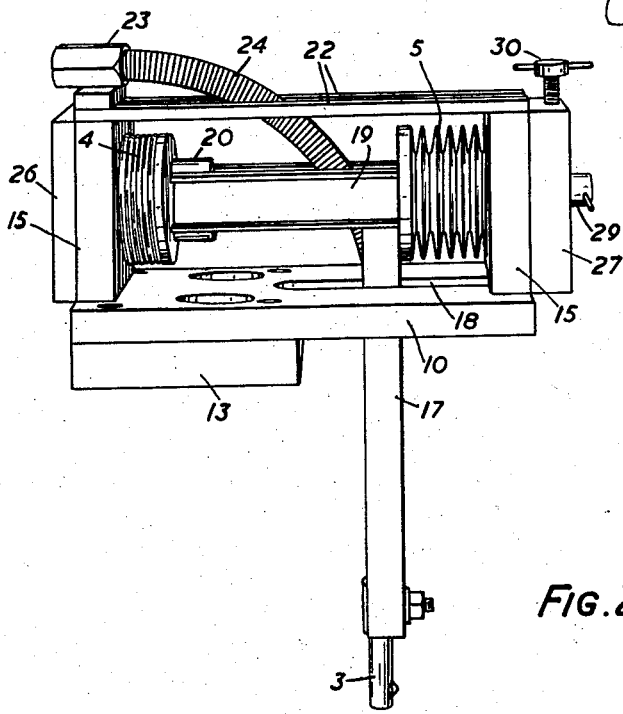
Figure 3:
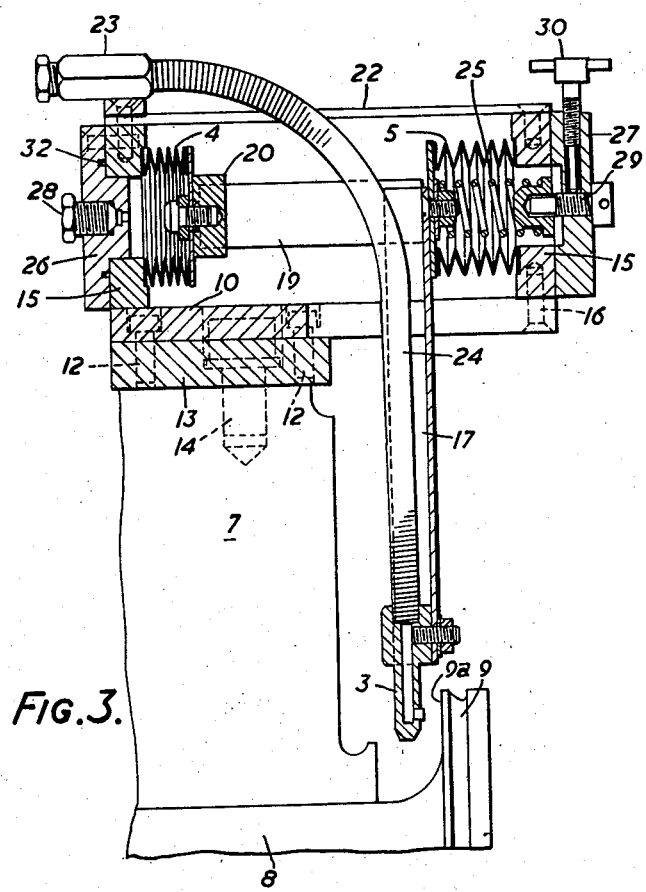

The invention will now be further described with reference to the accompanying drawings which illustrate, by way of example, a position indicator in accordance with the invention, and in which:

FIGURE 1 is a schematic view of an installation of the indicator to provide an indication of the axial displacement of a turbine shaft relatively to the turbine casing, FIGURE 2 is a side perspective view of a detecting head of the indicator, and FIGURE 3 is a longitudinal sectional view of the detecting head.

The indicator comprises the detecting head 1 and means 2 for providing a control pressure, the former comprising a primary nozzle 3 carried by two opposed coaxial metallic bellows 4 and 5 of a bellows system of a nozzle mounting 6 fixed to the turbine casing 7. The common axis of the bellows 4 and 5 is parallel to the turbine shaft 8 and the latter carries a fixed collar 9 presenting a radially directed surface 9a closely adjacent to which the primary nozzle 3 is arranged and directly towards which the nozzle discharges.

In FIGURE 1 the detecting head 1 is shown diagrammatically in section, and referring more particularly to FIGURES 2 and 3 the nozzle mounting 6 comprises a bottom plate 10 fixed by screws 12 to a bed plate 13 itself fixed by recessed screws such as 14 to the turbine casing 7. Two bellows plates 15 are respectively fitted by screws such as 16 at the ends of the bottom plate 10 and form outer end walls for the bellows 4 and 5. A channel section support 17 fixed to the inner end wall of the bellows 5 projects downwardly through a longitudinal slot 18 in the bottom plate 10 and carries at its lower end the primary nozzle 3. Two tie bars 19 respectively connect the side webs of the support 17, at the upper end of the latter, to a block 20 fixed to the inner end wall of the bellows 4.

The plates 15 are connected at their upper edges by spaced strips 22, and on these strips is mounted a nozzle connector 23. This connector communicates with the nozzle 3 through a flexible pipe 24 which pass between the strips 22 to lie within the channel section support 17. The bellows 4 forms a control bellows to which said control pressure is applied to urge the nozzle 3 towards the surface 9a, and the other bellows 5 of the nozzle mounting 6 exhausts freely to atmosphere and is spring loaded in the opposite direction by an internal compression spring 25.

End plates 26 and 27 respectively seal central apertures in the outer end walls of the bellows 4 and 5, the plate 26 being provided with a connector 28 and the plate 27 with an adjusting screw 29 and a locking screw 30. The screw 29 enables the compression of the spring 25 to be varied for adjustment of the indicator zero in a manner hereinafter described, this adjustment being locked by the screw 30. An O ring 32 forms a seal between the end plate 26 and end wall 15 of the bellows 4.

An operating source of pneumatic fluid for the indicator is provided by a pre-set pressure regulator 35 (FIGURE 1) which supplies a primary restrictor 36 which in turn feeds the primary nozzle 3 through a supply pipe 34 connected to the connector 23. A gauge 37 indicates the output pressure of the regulator 35. The means 2 for providing the control pressure are shown diagrammatically in FIGURE 1 and comprise a secondary nozzle 38 fed with pneumatic fluid through a supply pipe 39 by a secondary restrictor 40 which is also supplied from the pressure regulator 35. The control pressure is obtained from the downstream side of the secondary restrictor 40, and is applied to the control bellows 4 through a pipe 41.

The secondary nozzle 38 is variably throttled by a flapper 42 pivotally mounted at one end about a pivot 43 fixed relatively to the nozzle 38. The other end of the flapper 42 is carried by a bellows 44 to which the pressure at the downstream end of the primary restrictor 36, i.e. the nozzle pressure, is applied. The arrangement is thus such that an increase in the nozzle pressure moves the flapper 42 away from the secondary nozzle 38 to decrease the throttling of the latter and produce a corresponding decrease in the control pressure.

The mounting of the primary nozzle 3 between two opposed bellows 4 and 5 in the described manner produces a straight line movement of the nozzle 3 parallel to the turbine shaft 8 and perpendicular to the collar surface 9a in dependence upon variations in the control pressure. Other means may be used to ensure such a straight line motion, for example a suspension linkage comprising an arrangement of levers mounted on cross-springs.

Local and remote indicating means in the form of calibrated pressure gauges 45 and 46 are directly supplied through pipes 47 and 48 respectively with the control pressure from the downstream end of the secondary restrictor 40. These pressure gauges are calibrated in terms of shaft displacement about a centre zero, so that displacement of the shaft 8 relatively to the casing 7 in either direction from its normal position is directly indicated.

On setting up the indicator the pressure regulator 35 is first adjusted to provide the output pressure for which the indicator was originally calibrated, and this pressure may for example be 20 lbs. per sq. in. The adjusting screw 29 is now turned to so position the primary nozzle 3 relatively to the collar surface 9a that the pressure gauges 45 and 46 indicate zero. This is done with the turbine shaft 8 in its normal axial position relatively to the casing 7, and the indicator described is designed so that the gap between the primary nozzle 3 and the collar surface 9a is then approximately 3 thousandths of an inch.

Any axial displacement of the turbine shaft 8 from its normal position will vary the instantaneous gap between the collar surface 9a and the primary nozzle 3, and the changed throttling of the latter varies the instantaneous value of the nozzle pressure. As a result, the flapper 42 is moved to vary the throttling of the secondary nozzle 38 and hence the control pressure. This changed value of the control pressure acts on the control bellows 4 to produce a follow-up movement of the primary nozzle 3 which tends to restore the initial gap between this nozzle and the collar surface. A balance condition is obtained in which the resultant gap has a small offset with respect to its initial value so that the nozzle presure, and hence the control pressure, has a new stationary value dependent upon the degree of axial displacement of the shaft 8. Thus the reading of the pressure gauges 45 and 46 provides an indication of the shaft displacement and they may conveniently be calibrated in thousandths of an inch displacement.

As the resultant offset of the gap between the primary nozzle 3 and the collar surface 9a will have a positive or negative value according to whether the collar 9 moves away from or towards the primary nozzle 3, the calibration of the pressure gauges 45 and 46 with a central zero enables them also to provide an indication of the direction of shaft displacement.

I claim:

1. In pneumatic means for indicating the relative position of two parts, a nozzle mounting comprising a bellows system including a first bellows acting in opposition to a second bellows and adapted for location on one of said parts, a primary nozzle mounted between said bellows and adapted to discharge towards and be throttled by a surface of the other of said parts, a secondary nozzle the pressure upstream of which provides a control pressure fed to said first bellows, a third bellows, a throttling member for said secondary nozzle controlled by said third bellows, pipe means connecting the downstream side of said primary nozzle to said third bellows, and means for supplying pneumatic fluid to said nozzles so that movement of said surface varies the throttling of said primary nozzle to vary the primary nozzle pressure and hence the throttling of said secondary nozzle in a manner which varies the control pressure fed to said first bellows to produce movement of said primary nozzle tending to restore the original position of the latter relatively to said surface, whereby said primary nozzle follows said surface and said control pressure provides a pneumatic signal indicative of the relative position of said parts.

2. Indicating means according to claim 1, wherein said second bellows exhausts freely to atmosphere.

3. Indicating means according to claim 2, wherein adjustable spring-loading means act on said second bellows to oppose extension of said first bellows.

References Cited in the file of this patent

UNITED STATES PATENTS

| | | |
|---|---|---|
| 2,212,085 | Tate | Aug. 20, 1940 |
| 2,310,298 | Kuhl | Feb. 9, 1943 |
| 2,398,958 | Pellettere | Apr. 23, 1946 |
| 2,399,938 | Pet | May 7, 1946 |